(12) United States Patent
Twerdochlib

(10) Patent No.: US 7,654,145 B2
(45) Date of Patent: Feb. 2, 2010

(54) NON-SYNCHRONOUS VIBRATIONAL EXCITATION OF TURBINE BLADES USING A ROTATING EXCITATION STRUCTURE

(75) Inventor: Michael Twerdochlib, Oviedo, FL (US)

(73) Assignee: Siemens Energy, Inc., Orlando, FL (US)

( * ) Notice: Subject to any disclaimer, the term of this patent is extended or adjusted under 35 U.S.C. 154(b) by 308 days.

(21) Appl. No.: 11/862,752

(22) Filed: Sep. 27, 2007

(65) Prior Publication Data
US 2009/0084187 A1    Apr. 2, 2009

(51) Int. Cl.
*G01M 13/00*    (2006.01)
*G01H 17/00*    (2006.01)
*G01M 19/00*    (2006.01)

(52) U.S. Cl. .......................................... 73/660; 73/593

(58) Field of Classification Search ................. 73/593, 73/660
See application file for complete search history.

(56) References Cited

U.S. PATENT DOCUMENTS

| | | | |
|---|---|---|---|
| 4,020,678 A * | 5/1977 | Laue | 73/579 |
| 4,776,216 A | 10/1988 | Barton et al. | |
| 4,887,468 A | 12/1989 | McKendree et al. | |
| 4,907,456 A | 3/1990 | Rozelle | |
| 5,152,172 A * | 10/1992 | Leon et al. | 73/579 |
| 5,206,816 A * | 4/1993 | Hill et al. | 702/56 |
| 6,094,989 A * | 8/2000 | Twerdochlib | 73/659 |
| 6,668,651 B2 | 12/2003 | Beausseroy et al. | |
| 6,679,121 B2 | 1/2004 | Sonnichsen et al. | |
| 2002/0059831 A1* | 5/2002 | Naudet et al. | 73/579 |
| 2008/0206057 A1* | 8/2008 | Twerdochlib | 416/190 |
| 2009/0078052 A1* | 3/2009 | Twerdochlib | 73/660 |
| 2009/0078053 A1* | 3/2009 | Twerdochlib | 73/661 |

FOREIGN PATENT DOCUMENTS

| | | | | |
|---|---|---|---|---|
| JP | 62150133 A | * | 7/1987 | |
| JP | 2000097801 A | * | 4/2000 | |
| JP | 2000146772 A | * | 5/2000 | |

* cited by examiner

*Primary Examiner*—Hezron Williams
*Assistant Examiner*—Rose M Miller

(57) ABSTRACT

A method of measuring vibration in a bladed rotor structure with a vibration monitor. The vibration monitor includes a sensor for sensing passage of the sensor targets on radially outer portions of the blade structure, and the sensor generates signals corresponding to target passing events. An excitation structure is provided including at least one air jet for providing an excitation force to the blade structure. The blade structure is rotated about an axis of rotation and the air jet is driven in a circular path about the axis of rotation at a different rotational speed to apply a non-synchronous excitation force to the blade structure.

20 Claims, 3 Drawing Sheets

NON-SYNCHRONOUS VIBRATIONAL EXCITATION OF TURBINE BLADES USING A ROTATING EXCITATION STRUCTURE

FIELD OF THE INVENTION

The present invention relates to a method of measuring vibration of a blade structure in a turbine and, more particularly, to a method of measuring vibration by providing an excitation to turbine blades that is non-synchronous with the rotation of the blades.

BACKGROUND OF THE INVENTION

A high speed turbo machine, such as, for example, a steam or gas turbine, generally comprises a plurality of blades arranged in axially oriented rows, the rows of blades being rotated in response to the force of a high pressure fluid flowing axially through the machine. Due to their complex design, natural resonant mechanical frequencies of the blades may coincide with or be excited by certain blade rotational speeds and rotational harmonics thereof. To prevent excessive vibration of the blade about its normal position, prudent design practice dictates that the blades be constructed such that the frequencies of the lowest modes fall between harmonics of the operating frequency of the turbine. In addition, the blades may be excited by non-synchronous forces such as aerodynamic buffeting or flutter. In order to avoid the vibration exceeding certain levels and setting up objectionable stresses in the blades, it is common to monitor the vibrations of the blades, both during the design and testing of the turbine and during normal operation of the turbine. For example, it is known to use non-contacting proximity sensors or probes to detect blade vibrations. The probes detect the actual time-of-arrival of each blade as it passes each probe and provide corresponding signals to a blade vibration monitor system (BVM). Small deviations due to vibration are extracted, from which the BVM may determine the amplitude, frequency, and phase of the vibration of each blade.

In a known blades analysis technique, a system of one or more stationary air jets is commonly employed to provide vibration excitation, i.e., a driving force, to rotating turbine blades mounted on a disk placed within a vacuum spin pit. In this known excitation technique, the air jets excite the turbine blades at a multiple of the disk rotational speed. The disk rotational speed is ramped so as to cover a band of vibrational excitation frequencies. The frequency response of the blades may be detected using a blade tip vibration monitor, such as the BVM described above.

The known blade excitation techniques have several shortcomings. Specifically, only synchronous blade excitation frequencies are produced, i.e., multiples of disk speed. High measurement noise is inherent in synchronous blade tip measurements due to the addition of target structure and sensor placement contributions to the blade pass signals, specifically at synchronous frequencies. Also, multiple sensors are required to measure the synchronous frequencies, contributing to an increased equipment cost. Finally, since the blade frequency response is measured by ramping up the rotational speed of the blades, the blade responses are measured at speeds that are far from the operating speed for the blades. Hence, the blade resonances are measured at reduced centrifugal loading and blade untwist, which may result in an inaccurate characterization of the blade resonances.

SUMMARY OF THE INVENTION

In accordance with one aspect of the invention, a method of measuring vibration in a bladed rotor structure with a vibration monitor is provided. The bladed rotor structure comprises a plurality of blades supported on a rotor for rotation about a rotor axis. The vibration monitor comprises a stationary sensor positioned at a peripheral edge of the bladed rotor structure and a plurality of sensor targets positioned at circumferentially spaced locations on the bladed rotor structure. The method comprises the steps of providing at least one sensor for sensing passage of the sensor targets; providing an excitation structure adjacent to the rotor structure for providing an excitation force to the blades; rotating the rotor structure about the rotor axis at a first speed; causing the excitation structure to move in a circular path about the rotor axis at a second speed; and sensing target passing events caused by the sensor targets passing the at least one sensor to provide a time-dependent output signal responsive to passage of each the sensor target to the vibration monitor.

In accordance with another aspect of the invention, a method of measuring vibration in a bladed rotor structure with a vibration monitor is provided. The bladed rotor structure comprises a plurality of blades supported on a rotor for rotation about a rotor axis and a shroud structure coupling the blades and defining an outer circumference of the bladed rotor structure. The vibration monitor comprises a stationary sensor positioned at a peripheral edge of the bladed rotor structure and a plurality of sensor targets positioned at circumferentially spaced locations on the shroud structure. The method comprises the steps of providing at least one sensor for sensing passage of the sensor targets; providing an excitation structure including one or more air jets adjacent to the rotor structure for providing an excitation force, directed axially, generally parallel to the rotor axis, to the blades; rotating the rotor structure about the rotor axis at a first speed; causing the one or more air jets to move in a circular path about the rotor axis at a second speed; and sensing target passing events caused by the sensor targets passing the at least one sensor to provide a time-dependent output signal responsive to passage of each the sensor target to the vibration monitor.

BRIEF DESCRIPTION OF THE DRAWINGS

While the specification concludes with claims particularly pointing out and distinctly claiming the present invention, it is believed that the present invention will be better understood from the following description in conjunction with the accompanying Drawing Figures, in which like reference numerals identify like elements, and wherein.

DETAILED DESCRIPTION OF THE INVENTION

In the following detailed description of the preferred embodiment, reference is made to the accompanying drawings that form a part hereof, and in which is shown by way of illustration, and not by way of limitation, a specific preferred embodiment in which the invention may be practiced. It is to be understood that other embodiments may be utilized and that changes may be made without departing from the spirit and scope of the present invention.

Figure 1:
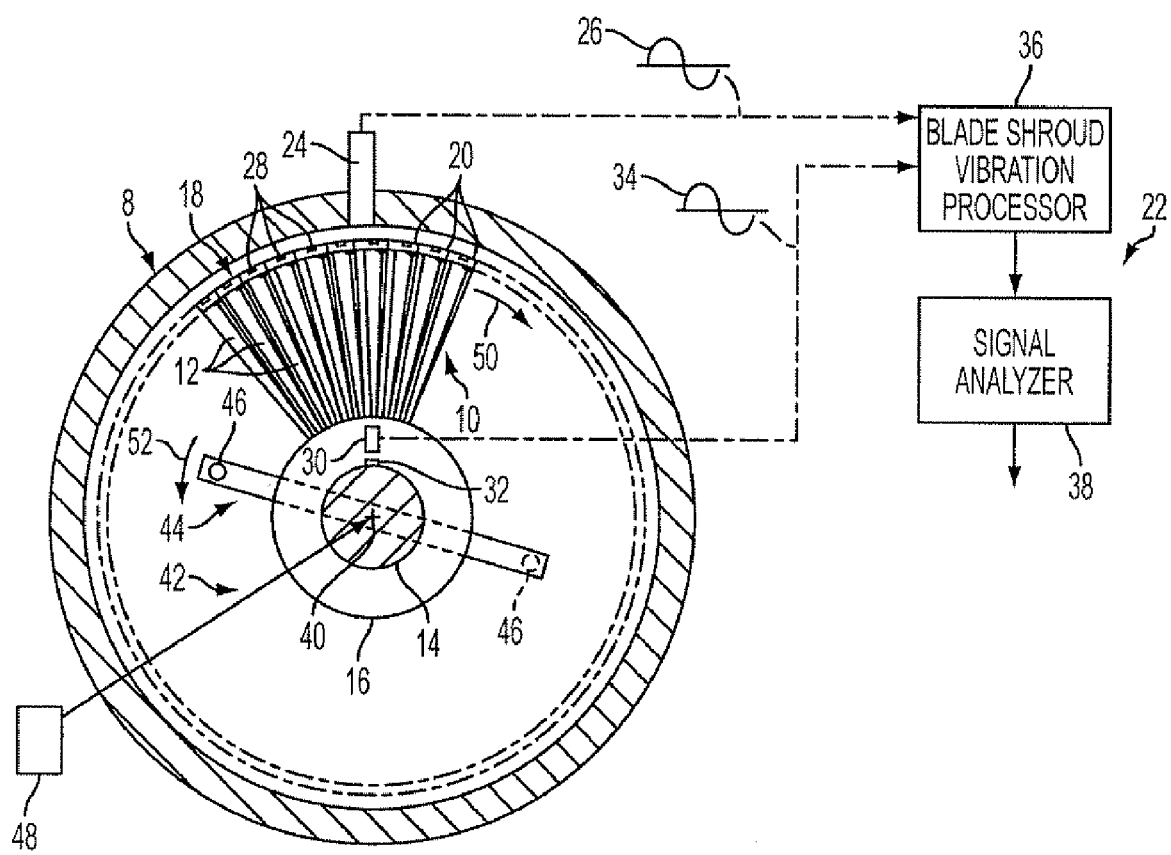
FIG. 1 is a diagrammatic view illustrating a turbine and a blade vibration monitor system and including an excitation structure for performing the present invention.

FIG. 1 diagrammatically illustrates a turbine housing 8 and a shrouded turbine blade row 10 in which the method of the present invention can be employed in a blade vibration monitoring system to monitor nonsynchronous turbine blade vibrations. Turbine blades 12 are connected to a rotor 14 by means of a rotor disk 16. Outer ends of the turbine blades 12 are interconnected by a circumferential outer shroud 18 defined by a plurality of shroud sections 20 attached to the blades 12. During operation of a turbine incorporating the blades 12 and outer shroud 18, the blades 12 and outer shroud 18 tend to vibrate at natural frequencies associated with the consolidated structure of the blades 12 and outer shroud 18 as they rotate about a rotor axis 40.

A nonsynchronous blade shroud vibration monitoring (BSVM) system 22 is also illustrated in FIG. 1. The BSVM system 22 includes a shroud target sensor 24 for producing a signal 26 having a near sinusoidal waveform, if a magnet sensor is used, with every other zero crossing, or other assigned signal level, corresponding to sensing passage of each of a plurality of sensor targets 28. It may be noted that the generated signal may alternatively comprise a short pulse signal if a laser sensor is employed.

In the illustrated embodiment, a target 28 is provided at a generally central location on each of the shroud sections 20, such that a target 28 is associated with each of the blades 12. However it should be noted that the present invention does not require that the number of targets 28 correspond to any particular number of blades 12 or shroud sections 20, and that the number of targets 28 may be fewer than or greater than the number described herein. The sensor 24 may comprise, for example, an Eddy current, reluctance, laser, infrared or microwave sensor. The targets 28 may comprise any triggering element that may be sensed by the aforementioned sensors including, for example, slots cut in the shroud sections 20, plasma deposited strips, or iron or steel targets imbedded in the shroud sections 20, where the shroud sections 20 are typically formed of a titanium alloy.

The signals provided by passage of the targets 28 past the sensor 24, i.e., target passing events, are indicative of an actual time-of-arrival of each target 28 at the sensor 24. In addition, a reference sensor 30 operates in conjunction with an indicia 32 on the rotor 14 to provide an output signal 34 having one zero crossing per rotor rotation, as is commonly know in the turbine art, to be used in analyzing the signals 26 received from the shroud target sensor 24. The signal 26 from the shroud target sensor 24 and the signal 34 from the reference sensor 30 are input to a blade shroud vibration processor 36. The blade shroud vibration processor 36 processes each of the output signals 26, 34 to determine and store a time-of-arrival for each target 28 passing the sensor 24, and for the rotor indicia 32 passing the reference sensor 30 providing a shaft phasor output. The time-of-arrival data stored in the processor 36 is provided as an input to a signal analyzer 38.

By way of example, the blade row 10 may include 58 blades, with a corresponding number of targets 28, rotating at a speed of 3600 RPM. In a BSVM analysis, data is collected for a predetermined number of rotations of the rotor 14, e.g., typically 32 rotations, and the data is sorted to construct the time-of-arrival data for the targets 28 on the shroud 18. Additional detail with regard to BSVM analysis of shrouded blades is described in patent application U.S. Ser. No. 11/711,843 entitled BLADE SHROUD VIBRATION MONITOR, the entire disclosure of which is incorporated herein by reference.

In order to analyze a variety of excitation frequencies of the blades 12, an excitation structure 42 is provided including a rotatable structure 44 supported for rotation about an axis that coincides with the rotor axis 40, and that will hereinafter be referred to as the rotor axis 40. The excitation structure 42 may comprise at least one excitation driver 46, hereinafter referred to as air jet 46, mounted to the rotatable structure 44, where the rotatable structure 44 is illustrated herein as including an elongated arm having a central portion supported for rotation at the rotor axis 40. The rotatable structure 44 may be driven in rotation at a controlled predetermined rotational speed by a drive mechanism, illustrated diagrammatically by driver 48 operably connected to the rotatable structure 44. In addition, a further or second excitation driver 46', hereinafter referred to as air jet 46', may be provided at an opposite end of the elongated arm of the rotatable structure 44 from the air jet 46. For the purposes of the following discussion, the invention will be considered as only including the single air jet 46; however, it should be understood that the description applies equally to the air jet 46' and that a plurality of additional air jets may also be provided to the rotatable structure 44.

It should be noted that the excitation driver 46 (or 46') may equivalently comprise one or more magnetic members for acting on the blades 12. For example, without limitation, the excitation driver 46 may comprise a permanent magnet or an electrical magnet.

The air jet 46 may be selectively positioned along the rotatable structure 44 to a predetermined radial location between the rotor axis 40 and the outer periphery defined by the outer shroud 18. The air jet 46 directs a substantially continuous stream of air in a direction generally parallel to the rotor axis 40 toward the blades 12. The rotatable structure 44 is preferably located behind the blade row 10, and the predetermined radial location for the air jet 46 preferably corresponds to a sensitive radial point along the blades 12 for exciting vibrations in the blades 12.

The driver 48 is adapted to rotate the rotatable structure 44 at a variety of different speeds or velocities in a circular path of movement about the rotor axis 40, including varying speeds to cause the blade excitation force frequency to vary. In addition, the driver 48 may be driven in either rotational direction. As illustrated in FIG. 1, the rotor 14 with blade row 10 is shown rotating in a first, clockwise direction 50 and the rotatable structure 44 is shown rotating in a second, counterclockwise direction 52. Accordingly, it may be understood that a range of excitation frequencies may be produced by providing different relative rotational speeds between the rotor 14 and blade row 10 (rotated at a first speed) and the rotatable structure 44 (rotated at a second speed), as determined by a selected speed and direction of rotation for the rotatable structure 44. In particular, it should be noted that by providing a relative rotational speed between the blade row 10 and the air jet 46, a vibration excitation frequency provided by the air jet 46 to the blade row 10 is nonsynchronous with the rotational speed of blade row 10 relative to the shroud target sensor 24. Accordingly, vibration frequencies that are synchronous with the rotational velocity of the blade row 10 may be sensed at the target sensor 24 and analyzed by the BSVM 22.

Figure 2:
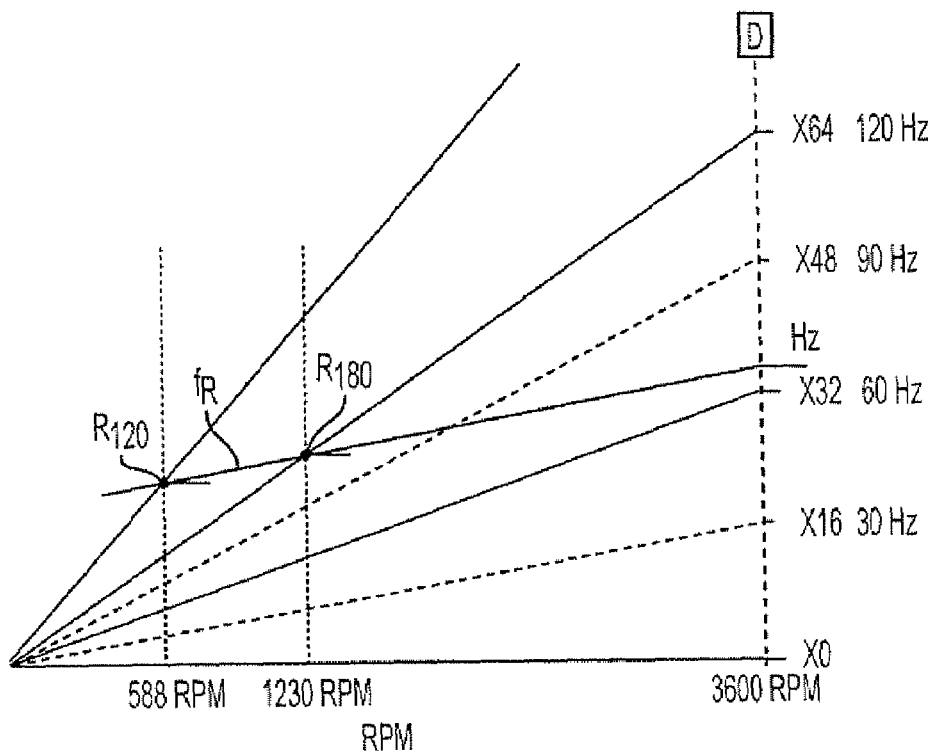
FIG. 2 is a Campbell diagram illustrating a first operating condition for a rotatable structure of the present invention.

Referring to FIG. 2, a Campbell diagram illustrates a first operating condition for the rotatable structure 44 of the present invention in which the rotatable structure 44 is held stationary, i.e., non-rotating, during spin-up of the rotor 14, and the frequency data produced by the target passing events is collected by the BSVM 22. As the rotor speed increases, resonance vibrations are created at certain speeds. In particular, at 588 rpm and 1230 rpm, a synchronous vibration of the blades occurs, as identified at points $R_{120}$ and $R_{180}$, respectively. The points $R_{120}$ and $R_{180}$ correspond to the intersection of the blade resonance frequency line $f_R$ with the second subharmonic line (×64; 120 Hz) and the third subharmonic line (×96; 180 Hz), respectively, where the second and third harmonics refer to harmonics of running speed. In addition, it should be understood that in the present example, using a 32 revolution data collection period, the harmonics of the running speed occur at (60/32)×(32, 64, 96 . . . ), where 60 is the rotational frequency of the rotor 14, and 60/32=1.875 Hz is referred to as the subharmonic frequency width (or Fourier bin width). Accordingly, the nomenclature ×32, ×64, ×96, . . . corresponds to 1.875×32, 1.875×64, 1,875×96 . . . , as is known in the art.

Figure 3:
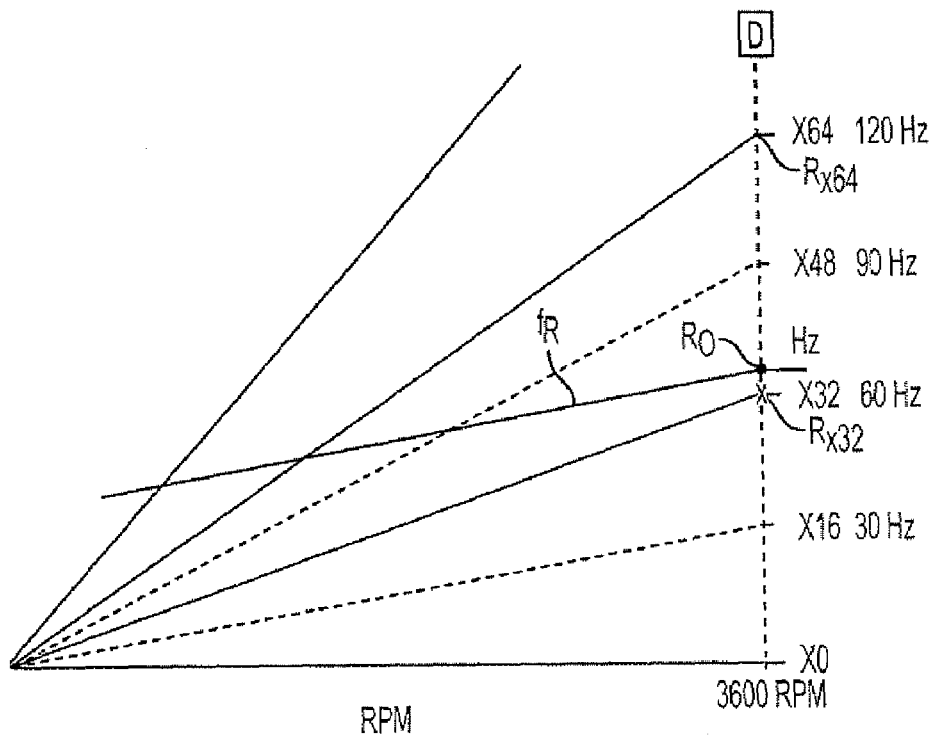
FIG. 3 is a Campbell diagram illustrating a condition where the rotor has completed its spin up and is maintained at its operating speed.

FIG. 3 illustrates a condition where the rotor 14 has spun up to and is maintained at its operating speed of 3600 rpm (frequency=60 Hz), and with the rotatable structure 44 maintained stationary. It can be seen that the driving force provided by the stationary air jet 46 consists of only the subharmonics that are synchronous with the rotor speed. Thus, only synchronous excitation of a blade is possible. That is, only the subharmonics occurring at ×32 (60 Hz), ×64 (120 Hz), ×96 (180 Hz) . . . will be excited, as illustrated at points $R_{x32}$ and $R_{x64}$ in FIG. 3. Further, it can be seen that the blade resonance line $f_R$ intersects the vertical 3600 rpm line D at a point $R_O$ corresponding to a subharmonic occurring at ×35 (65.625 Hz), which is the resonance frequency of the blade at its operating speed. Hence, it can be seen with rotatable structure 44 maintained in stationary relation to the sensor 24, the excitation forces applied against the blades 12 are synchronous with the speed of rotation, such that resonance frequencies of the blades 12 cannot be identified while the rotor 14 is maintained at its normal operating speed.

Figure 4:
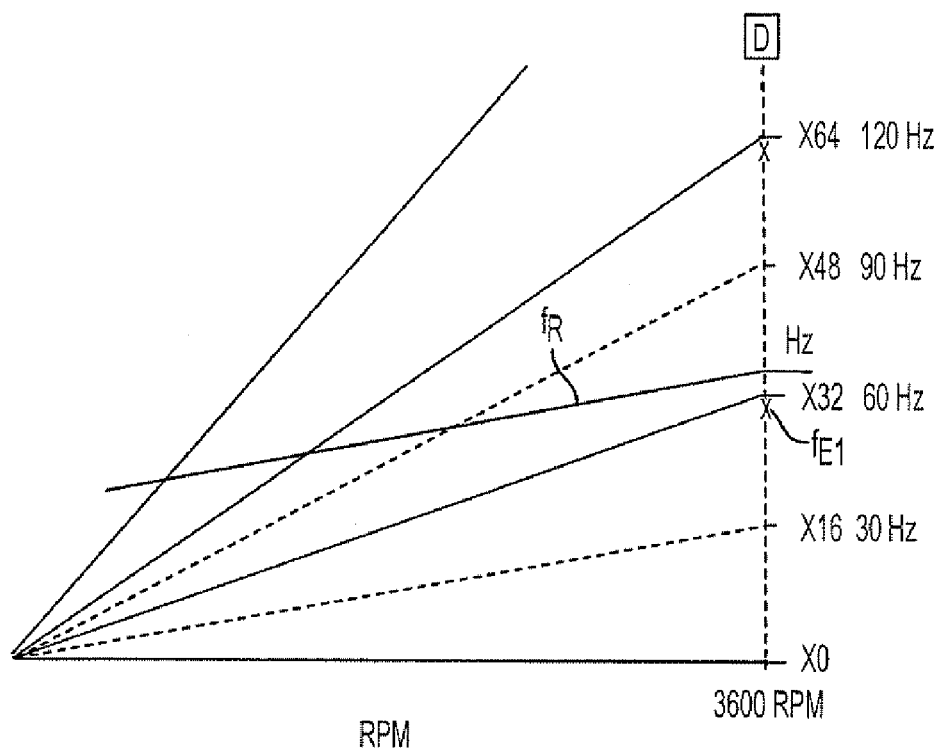
FIG. 4 is a Campbell diagram illustrating a first rotating condition of the rotatable structure in which the rotatable structure is rotating in the same direction as the rotor.

Referring to FIG. 4, a first illustrative example of a rotating condition of the rotatable structure 44 is shown by a Campbell diagram. Specifically, the rotatable structure 44 rotates the single air jet 46 about the rotor axis 40 in the direction of rotor rotation, i.e., the clockwise direction in FIG. 1, at a speed of 1.875 Hz which corresponds to one subharmonic frequency width. The rotor speed is maintained at 3600 rpm (60 Hz). This condition retards the frequency of the excitation force by 1.875 Hz, as indicated by the point $f_{E1}$ (58.125 Hz) on the 3600 rpm line D. Hence, an excitation force at a frequency of ×31 (58.125 Hz) is applied to the blades 12, which is displaced downwardly from the ×32 (60 Hz) frequency synchronous subharmonic.

Figure 5:
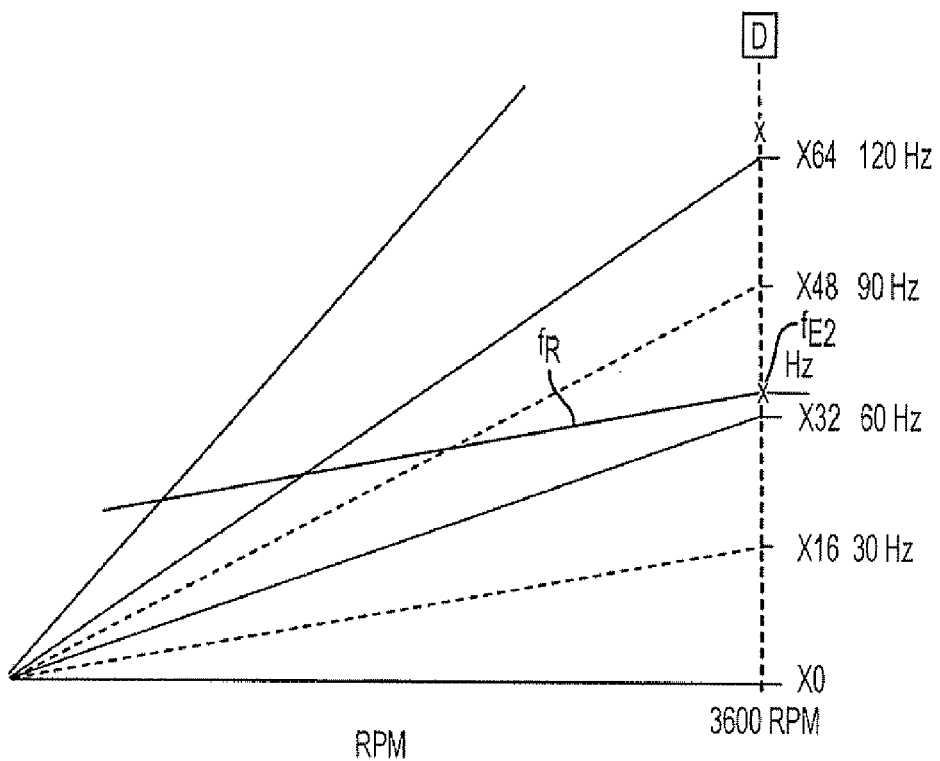
FIG. 5 is a Campbell diagram illustrating a second rotating condition of the rotatable structure in which the rotatable structure is rotating in the direction opposite from the rotor.

Referring to FIG. 5, a second illustrative example of a rotating condition of the rotatable structure 44 is shown by a Campbell diagram. Specifically, the rotatable structure 44 rotates the single air jet 46 about the rotor axis 40 in the direction opposite from the rotor rotation, i.e., the counterclockwise direction in FIG. 1, at a speed of 3×1.875 Hz (5.625 Hz) which corresponds to three subharmonic frequency widths. The rotor speed is maintained at 3600 rpm (60 Hz). This condition advances the frequency of the excitation force by 3×1.875 Hz, as indicated by the point $f_{E2}$ (65.625 Hz) on the 3600 rpm line D. Hence, an excitation force at a frequency of ×35 (65.625 Hz) is applied to the blades 12, coinciding with the intersection of the blade resonance line $f_R$ and the 3600 rpm line D, and producing a resonance response in the blades 12. Since the excitation force is not synchronous with the rotation of the blades 12, the BSVM 22 will detect the non-synchronous vibration response.

In accordance with the present invention, the rotor 14 may be maintained at a constant operating speed, preferably the design speed for the turbine, and the rotatable structure 44 may be driven at different speeds. This provides the advantage that the combined structure of the blades 12 and the shroud 18 will be rotated at the operating speed to induce operating condition centrifugal forces and blade untwist very close that experienced during actual turbine operation. In a preferred application of the invention, the rotor 14 is maintained at or close to the operating speed and the rotatable structure 44 is rotated at a slowly increasing speed to cause the excitation force provided by the rotating air jet 46 to sweep through a range of excitation frequencies. As the excitation frequency increases, it will pass through resonance frequencies of the blades 12 to thereby identify non-synchronous vibration frequencies that may occur during operation of the turbine at its operating speed.

Since the induced vibration becomes synchronous whenever the air jet induced excitation frequency crosses a multiple of 60 Hz during the above described method, no blade vibration measurement is made at these synchronous points. However, these synchronous excitation points may be tested by either increasing or decreasing the rotor speed by approximately 2 Hz, such that the synchronous harmonics no longer occur at multiples of 60 Hz. The measurement is repeated by maintaining the rotor 14 at the new speed and again causing the air jet to move at a slowly increasing speed to sweep through a range of excitation frequencies, permitting measurements to be taken at frequencies that are multiples of 60 Hz. Since the new speed of the rotor 14 is very close to the turbine operating speed, the new speed will not result in a substantial change in the centrifugal force and blade untwist forces applied to the blades 12, providing conditions which substantially match those occurring at the actual operating speeds of the turbine.

It should be understood that increasing the number of air jets 46 increases the excitation frequency of the excitation structure 42 a proportional amount, for a given speed of rotation of the rotatable structure 44. For example, by including the air jet 46' to the rotatable structure 44, as seen in FIG. 1, the excitation frequency will be increased by a factor of two. Hence, by providing a plurality of N equally spaced air jets 46, the excitation frequency will be increased by a factor of N. Rather than adding more air jets 46 to increase the frequency of blade excitation, the rotation speed of the rotatable structure, i.e., the rotational speed-per-Hertz induced vibration, may be decreased an amount proportional the factor N. As the number of air jets 46 is increased, the amount of air supplied to each jet is also reduced by the factor N, such that in the illustrated example of adding the additional air jet 46', the amount of air supplied to the two air jets 46, 46' would be reduced by a factor of 2 in comparison to the amount of air supplied to the single air jet 46.

In addition, the use of multiple air jets 46, i.e., varying the factor N, can be used to selectively excite specific nodal diameter patterns on the blade structure. Nodal diameter (ND) refers to the phase pattern that is observed around the shrouded blade row 10. For example, ND=1 means that that there is a 360/1*n shift in the vibration phase between each of the blades 12, where n=number of blades 12. A nodal diameter ND=9 means that the vibration shift between each of the n blades (targets) is 360/9*n degrees. The higher the ND pattern the more rigid the shrouded blade row 10 becomes, typically resulting in more stress per mil of vibration. The nodal diameter is observed as a blade displacement pattern in and out of the plane of the blades 12, as seen, for example, by taking a flash picture of the shrouded blade row 10 with a camera. While this is also true for free standing blade rows, the different nodal diameters do not lead to additional stiffness or stress since the blades are not constrained to one another.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A method of measuring vibration in a bladed rotor structure with a vibration monitor, said bladed rotor structure comprising a plurality of blades supported on a rotor for rotation about a rotor axis, and said vibration monitor comprising a stationary sensor positioned at a peripheral edge of said bladed rotor structure and a plurality of sensor targets positioned at circumferentially spaced locations on said bladed rotor structure, comprising the steps of:
   providing at least one sensor for sensing passage of said sensor targets;
   providing an excitation structure adjacent to said rotor structure for providing an excitation force to said blades;
   rotating said rotor structure about said rotor axis at a first speed;
   causing said excitation structure to move in a circular path about said rotor axis at a second speed; and
   sensing target passing events caused by said sensor targets passing said at least one sensor to provide a time-dependent output signal responsive to passage of each said sensor target to said vibration monitor.

2. The method of claim 1, wherein said second speed of said excitation structure is different than said first speed of said rotor structure.

3. The method of claim 2, wherein said excitation structure excites vibrations in said rotor structure at frequencies that are non-synchronous with said first speed of said rotor structure.

4. The method of claim 2, wherein the direction of movement of said excitation structure is opposite from the direction of rotation of said rotor structure.

5. The method of claim 1, wherein the direction of movement of said excitation structure is opposite from the direction of rotation of said rotor structure.

6. The method of claim 1, wherein said excitation structure comprises at least one air jet providing a substantially continuous excitation force to all of said blades in a blade row of said rotor structure for a plurality of rotations of said rotor structure.

7. The method of claim 1, wherein said step of rotating said rotor structure comprises rotating said rotor structure at a substantially constant first speed, and said step of causing said excitation structure to move in a circular path comprises moving said excitation structure at an increasing second speed.

8. The method of claim 1, wherein said excitation structure comprises a plurality of excitation drivers that are movable concentrically about said rotor axis.

9. The method of claim 8, wherein said excitation drivers are substantially equally spaced and an excitation frequency provided by said excitation structure is proportional to a factor N, where N is the number of excitation drivers, and the factor N is selected to excite a predetermined nodal diameter pattern on a blade row of said rotor structure.

10. The method of claim 1, wherein said excitation structure comprises at least one air jet located radially inwardly from said peripheral edge of said bladed rotor structure and providing an excitation force directed axially, generally parallel to said rotor axis.

11. The method of claim 1, wherein said bladed rotor structure comprises a shroud structure coupling said blades and said sensor targets are positioned at circumferentially space locations on said shroud structure.

12. A method of measuring vibration in a bladed rotor structure with a vibration monitor, said bladed rotor structure comprising a plurality of blades supported on a rotor for rotation about a rotor axis and a shroud structure coupling said blades and defining an outer circumference of said bladed rotor structure, and said vibration monitor comprising a stationary sensor positioned at a peripheral edge of said bladed rotor structure and a plurality of sensor targets positioned at circumferentially spaced locations on said shroud structure, comprising the steps of:
   providing at least one sensor for sensing passage of said sensor targets;
   providing an excitation structure including one or more air jets adjacent to said rotor structure for providing an excitation force, directed axially, generally parallel to said rotor axis, to said blades;
   rotating said rotor structure about said rotor axis at a first speed;
   causing said one or more air jets to move in a circular path about said rotor axis at a second speed; and
   sensing target passing events caused by said sensor targets passing said at least one sensor to provide a time-dependent output signal responsive to passage of each said sensor target to said vibration monitor.

13. The method of claim 12, wherein said second speed of said one or more air jets is different than said first speed of said rotor structure.

14. The method of claim 13, wherein the direction of movement of said one or more air jets is opposite from the direction of rotation of said rotor structure.

15. The method of claim 12, wherein said one or more air jets excite vibrations in said rotor structure at frequencies that are non-synchronous with said first speed of said rotor structure.

16. The method of claim 15, wherein the direction of movement of said one or more air jets is opposite from the direction of rotation of said rotor structure.

17. The method of claim 12, wherein said one or more air jets provides a substantially continuous excitation force to all of said blades of said rotor structure for a plurality of rotations of said rotor structure.

18. The method of claim 12, wherein said step of rotating said rotor structure comprises rotating said rotor structure at a substantially constant first speed, and said step of causing said one or more air jets to move in a circular path comprises moving said one or more air jets at an increasing second speed.

19. The method of claim 12, wherein said excitation structure comprises at least two air jets that are movable concentrically about said rotor axis.

20. The method of claim 19, wherein said at least two air jets are coupled for movement together about said rotor axis.

* * * * *